(12) United States Patent
Stoner

(10) Patent No.: US 9,476,443 B2
(45) Date of Patent: Oct. 25, 2016

(54) NUT AND WASHER ASSEMBLY

(71) Applicant: Gallagher Group Limited, Hamilton (NZ)

(72) Inventor: Daniel Stoner, Hamilton (NZ)

(73) Assignee: GALLAGHER GROUP LIMITED, Hamilton (NZ)

( * ) Notice: Subject to any disclaimer, the term of this patent is extended or adjusted under 35 U.S.C. 154(b) by 65 days.

(21) Appl. No.: 14/631,284

(22) Filed: Feb. 25, 2015

(65) Prior Publication Data
US 2016/0245329 A1 Aug. 25, 2016

(51) Int. Cl.
F16B 43/00 (2006.01)
F16B 37/08 (2006.01)

(52) U.S. Cl.
CPC ............... *F16B 37/08* (2013.01); *F16B 43/00* (2013.01)

(58) Field of Classification Search
CPC ....... F16B 37/08; F16B 43/00; F16B 43/003
USPC .......................................... 411/531, 533, 546
See application file for complete search history.

(56) References Cited

U.S. PATENT DOCUMENTS

| | | | | |
|---|---|---|---|---|
| 827,562 A * | 7/1906 | Pollock et al. | ......... | F16B 39/24 411/136 |
| 1,894,631 A * | 1/1933 | Owen | ................... | F16B 39/108 411/144 |
| 2,631,633 A * | 3/1953 | Peckham | ................. | F16B 39/26 411/134 |
| 2,777,247 A * | 1/1957 | Rosenberg | ............... | A47B 9/20 248/188.5 |
| 2,779,375 A * | 1/1957 | O'Connor | ............... | F16B 39/26 411/134 |
| 3,016,941 A * | 1/1962 | Coldren | ................... | F16B 39/26 411/134 |
| 3,050,097 A * | 8/1962 | Cochran | ............... | F16B 37/043 411/107 |
| 3,163,198 A * | 12/1964 | Zahodiakin | ........... | F16B 37/042 411/112 |
| 4,431,353 A * | 2/1984 | Capuano | ................. | B60B 3/145 411/11 |
| 4,479,747 A * | 10/1984 | Pagel | ...................... | F16B 39/26 411/427 |
| 4,654,913 A * | 4/1987 | Grube | .................... | B21D 53/24 470/18 |
| 5,380,136 A * | 1/1995 | Copple | ................. | F16B 37/044 411/104 |
| 5,509,766 A * | 4/1996 | Leuschner | ............. | F16K 31/06 411/186 |
| 5,975,821 A * | 11/1999 | Kue | ........................ | F16B 43/00 411/526 |
| 6,039,524 A * | 3/2000 | McKinlay | ............. | F16B 39/282 411/136 |
| 6,499,923 B2 * | 12/2002 | LeVey | ................... | F16B 37/042 411/172 |
| 6,866,456 B2 * | 3/2005 | Bentrim | ................ | F16B 37/065 411/353 |
| 7,083,372 B2 * | 8/2006 | Winker | ................... | F16B 39/26 411/155 |
| 8,459,919 B2 * | 6/2013 | Ehrler | ...................... | F16B 39/26 411/149 |
| 8,591,157 B1 * | 11/2013 | Stewart | ................... | F16B 31/02 411/10 |
| 2004/0235599 A1 * | 11/2004 | Ozorak | ................. | F16C 13/006 474/199 |
| 2015/0176434 A1 * | 6/2015 | Gerend | ................... | F23R 3/002 411/531 |

* cited by examiner

*Primary Examiner* — Roberta Delisle
(74) *Attorney, Agent, or Firm* — Hauptman Ham, LLP

(57) ABSTRACT

A nut and washer assembly, wherein the assembly includes a nut having a body configured with a pair of flanges defining a channel there between, wherein the first flange includes a gap there through, and a washer having an outer perimeter and an inner perimeter, wherein the washer also includes a plurality of projections, wherein a first projection arises proximate the inner perimeter and is complementary to the gap in the first flange of the nut and a second projection arises proximate the outer perimeter and is complementary to the channel of the nut.

7 Claims, 4 Drawing Sheets

NUT AND WASHER ASSEMBLY

TECHNICAL FIELD

The present invention relates to a nut and washer assembly. The invention has particular application to an anti-rotation washer.

BACKGROUND ART

Washers are widely used in engineering and are typically used as a spacer, a locking device, or simply to spread the load of the threaded fastener with which it is to be used. Washers are most commonly used with nuts, screws and bolts.

However, the use of washers does add complications when assembling products requiring same.

Firstly, the user has to align the washer to the aperture of the nut or alternatively, place it over the fastener with which it is to be used. Given the size of some washers, it is easy to drop or misplace it during use.

Then, the user has to keep the washer in alignment as the nut or fastener is mated with its complementary member. Again, given the size of some washers, the user can easily drop the washer and/or nut/fastener.

The process of mating the washer and nut/fastener must then be restarted, either by locating the dropped items or finding replacements. This is time consuming, adding to the assembly process, or wasteful if replacements have to be found.

It is an object of the present invention to address the foregoing problems or at least to provide the public with a useful choice.

All references, including any patents or patent applications that may be cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications may be referred to herein, this reference does not constitute an admission that any of these documents form part of the common general knowledge in the art, in the United States or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to one aspect of the present invention, there is provided a nut and washer assembly, wherein the assembly includes:
a nut having a body configured with a pair of flanges defining a channel there between, wherein the first flange includes a gap there through, and
a washer having an outer perimeter and an inner perimeter, wherein the washer also includes a plurality of projections, wherein one projection arises proximate the inner perimeter and is complementary to the gap in the first flange of the nut and a second projection arises proximate the outer perimeter and is complementary to the channel of the nut.

According to one aspect of the present invention, there is provided a nut for a nut and washer assembly, wherein the nut includes:
a body configured with a pair of flanges defining a channel there between, wherein the first flange includes a gap there through.

According to one aspect of the present invention, there is provided a washer for a nut and washer assembly, wherein the washer includes:
an outer perimeter, and
an inner perimeter, and
a plurality of projections, wherein a first projection arises proximate the inner perimeter, and a second projection arises proximate the outer perimeter, wherein the second projection includes a lateral protrusion extending partially towards the inner perimeter.

According to another aspect of the present invention, there is provided a method of using a nut and washer assembly substantially as described above, the method including the steps of:
 a) mating the washer with the nut; and
 b) threading a fastener through the washer and nut assembly.

The invention offers a solution to the problem of misplacement of washers, as it provides a combined nut and washer assembly which includes a means to allow the easy alignment of the assembly with respect to the fastener with which it is to be used. This avoids the need for the user to have to handle the washer during installation of the nut and washer assembly.

The nut should be understood to include a body, which has a top, sides, and a base. A central aperture for a fastener runs through the body between the top and the base.

The nut may be manufactured from any suitable material, such as alloy metal or plastics material. Persons skilled in the art will readily appreciate which alloys may be suitable depending on the end use of the nut and washer assembly.

The sides of the body includes contact surfaces with which a fastening instrument, such as a spanner, wrench or similar device, may be used to tighten the nut onto the bolt with which it is to be used.

It will be appreciated that the body of the nut may take a variety of forms depending on the application and apparatus with which it is to be used. For example, the nut body may be a six-sided geometric shape such as commonly found in conventional fasteners.

The nut should be understood to include a first and second flange. The first flange extends from the perimeter of the base of the nut, and effectively provides a shield to avoid the fastening instrument from coming into contact with the washer.

The first flange may have a diameter that varies according to the requirements of the user, but at the very least approximates the diameter of the washer that is to be used with the nut. This is so that the washer itself is adequately shielded.

Depending downwards (i.e. away from the top of the body of the nut) from the flange is a neck portion, the neck portion also including the second flange of the nut.

The neck and second flange includes a gap or aperture extending through into the interior of the nut. This should be understood to mean the neck and second flange is discontinuous. The purpose of this gap will be apparent from the ensuing discussion pertaining to the washer.

In some embodiments of the present invention, two gaps may be provided in the neck and second flange, wherein the gaps are directly opposite each other. However, for ease of manufacture, a single gap will be sufficient.

It will be appreciated that the configuration of the first and second flanges is such that a recess or channel running or circumscribing the perimeter of the nut is defined between them. The recess or channel may have a consistent depth but in some embodiments of the present invention, the depth of the channel decreases as it progresses away from the gap in the neck and second flange. Preferably, in these embodiments, the depth of the channel is at its shallowest midway between the two gaps of the neck and second flanges.

The washer should be understood to be a flat disc- or ring-like structure, which includes a plurality of projections arising from one side of its surface.

The washer may be manufactured from any suitable material, such as alloy metal or plastics material. Persons skilled in the art will readily appreciate which alloys may be suitable depending on the end use of the nut and washer assembly.

An aperture is provided at the centre of the washer to allow the passage of a fastener. Therefore, the washer has an outer perimeter and an inner perimeter.

At least one projection arises proximate the outer perimeter of the washer, and has an inverse L-shaped profile, i.e. the projection has a vertical element extending upwards from proximate the outer perimeter, and includes a horizontal element. It should be appreciated that this profile means the horizontal element of the projection is substantially parallel to the flat surface of the disc, and projects inwards towards the centre of the washer. This effectively defines a cavity between the horizontal element of the projection and the flat surface of the washer.

In preferred embodiments, the projection is dimensioned such that it is relatively elongate and the vertical element at least circumscribes at least a partial arc about the outer perimeter of the washer. The horizontal element may extend from all along the length of the arc of the vertical element or just a portion of the arc.

In preferred embodiments the horizontal element of the projection extends laterally from the top of the vertical element. However, in some embodiments of the present invention, the horizontal element may extend laterally from a point along the length of the vertical element. This projection is complementary to the recess that is defined between the first and second flanges of the nut. It will be appreciated that the cavity defined by the projection is complementary to the profile of the second flange and the horizontal element engages with the channel defined by the first and second flanges.

In preferred embodiments, the washer includes at least two of these types of projections.

The free end of the horizontal element (it will be understood that the other end meets the vertical element) which penetrates into the channel defined by the first and second flanges of the nut is preferably configured as an arc, which is at least partially complementary to the circumference of the channel.

Preferably, at least a portion of the distance between these projections, which shall hence forth be referred to as retaining claws, is less than the diameter of the neck of the nut.

Preferably, this is achieved by having the outer ends of the arc configured such that they contact the bottom of the channel that circumscribes the nut when the user offers the washer up to the nut. The central portion of the arc should be understood to be configured such that there is a small amount of clearance between this portion of the retaining claws to the bottom of the channel of the nut.

This means the horizontal element of the retaining claw cannot freely enter the full depth of the channel; the user must apply a little force in order to overcome the friction between the outer ends of the arc and the bottom of the channel before the washer can become fully engaged with the nut.

To install the washer onto the nut, the gap between the retaining claws is placed in alignment with the channel provided between the first and second flanges of the nut body and the washer pressed across the nut, with the user applying a gentle force in order to overcome the interference resistance between the outer ends of the arc of the retaining claws and the bottom of the channel. This will usually occur as the outer ends of the two arcs of the retaining claws approach the centre of the channel where the distance across the channel is at its greatest. The retaining claws, and therefore the washer, is effectively slid into the channel through this action. Once fully inserted, the washer can be rotated relative to the nut.

The washer includes at least one further projection, which arises directly from the same surface of the washer as the retaining claws.

In preferred embodiments of the invention, there are two such projections, which are paired and oppose each other. For ease of reference, this second pair of opposing projections shall now be referred to as a peg or pegs.

The peg or pegs should be understood to be positioned such that they abut or extend from the inner perimeter of the washer (the retaining claws arising from the outer perimeter).

In its simplest form, the peg may simply be a protrusion extending in the same plane as the flat side of the washer.

However, in preferred embodiments, the peg or pegs may include a vertical element arising in the same direction as the vertical elements of the retaining claws. If not present, it is possible that, if the washer is relatively thin, the peg may engage with the thread of the fastener with which the nut and washer assembly is to be used.

Preferably, when there are two such pegs, they oppose each other although this is not meant to be limiting.

In preferred embodiments, the outer edge or perimeter of the washer corresponding with the position of the two pegs are profiled to provide an indication of their respective positions. This is to allow the user to align the bolt with which the nut assembly is to be used with these projections.

This may be achieved in a number of ways, including adjusting the profile of the outer perimeter of the washer with a contour or the like.

It should be appreciated that the present invention requires a specially configured bolt with which it is to be used. These bolts need to include at least one groove extending along the shaft, dimensioned to approximate the peg of the washer. In embodiments where the peg includes a vertical element, it will be understood that this substantially corresponds with the orientation of the groove.

In preferred embodiments of the invention, in which there are two pegs, it will be appreciated that the shaft of the fastener includes two grooves.

In use, the bolt will be offered up to the nut and washer assembly, aided by the protrusions that act as a guide to indicate the position of the pegs. It will be understood that the pegs must be aligned with the gap in the neck and second flange of the nut in order to pass through it. The bolt can then be passed through the fastener and into the nut.

As the nut is then rotated, the washer remains fixed relative to the bolt due to the cooperation between the pegs of the washer and the grooves of the bolt.

This prevents the washer from rotating and creates the clamping force without torsion.

The invention offers a number of advantages including:
the ability to preassemble a nut and washer assembly;
improved retention of the washer to the nut;
creates clamping force without twisting the components being mated with by the nut and washer assembly and fastener; and
is easy to use and install.

At the very least, the present invention offers the public a useful choice.

BRIEF DESCRIPTION OF THE DRAWINGS

Further aspects of the present invention will become apparent from the ensuing description which is given by way of example only and with reference to the accompanying drawings in which.

BEST MODES FOR CARRYING OUT THE INVENTION

Figure 1:
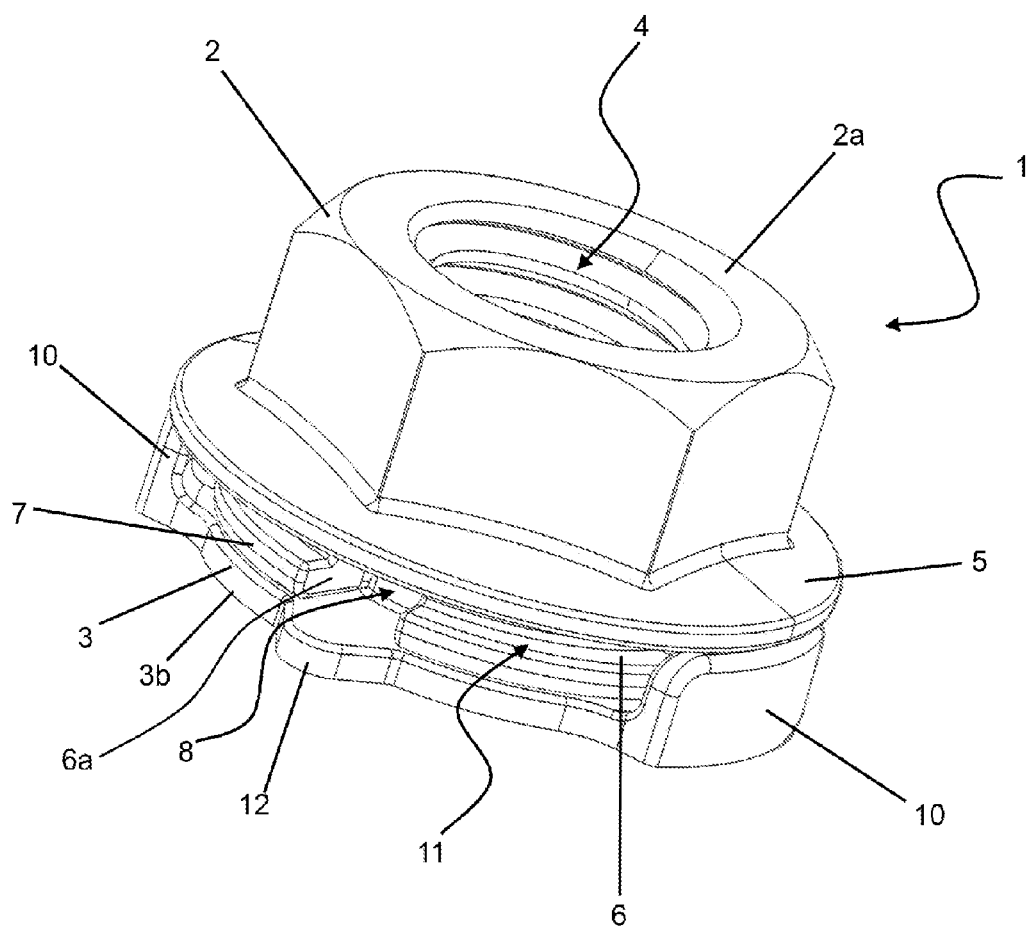
FIG. 1 is a top perspective view of one embodiment of the invention.
Figure 2:
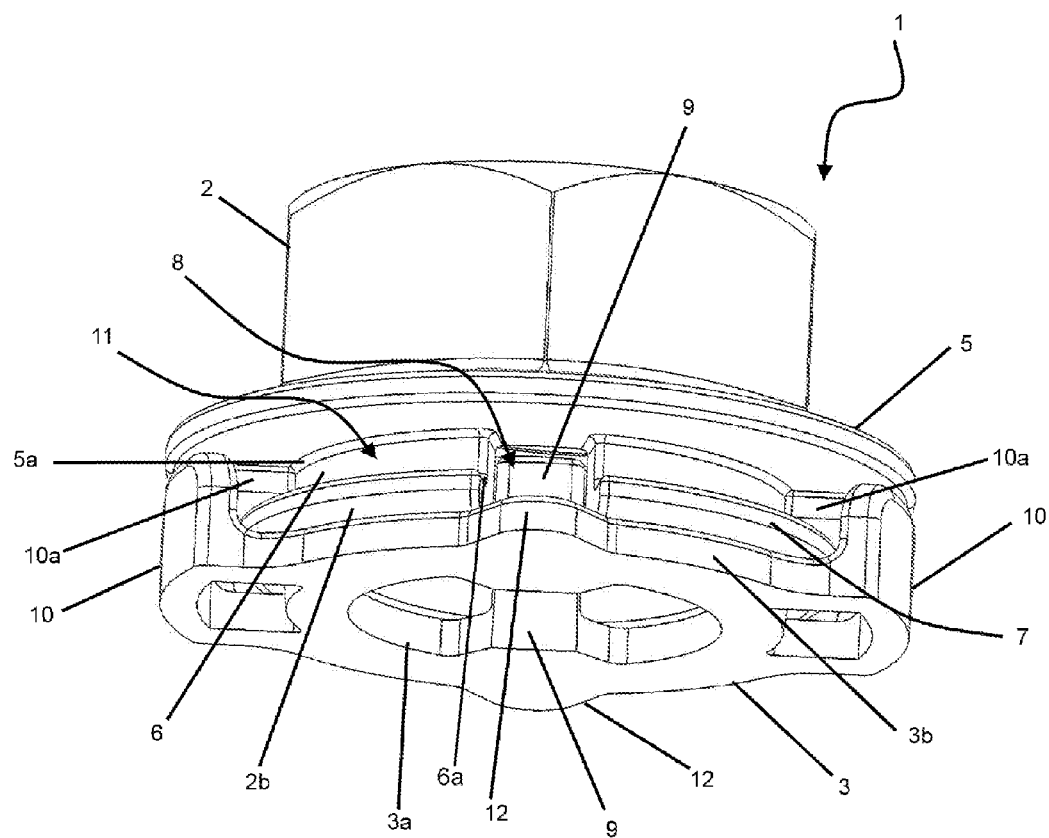
FIG. 2 is a side perspective view of the embodiment of FIG. 1.

The present invention is illustrated in FIGS. 1 and 2 and includes an assembly (generally indicated by arrow 1) of a nut (2) and washer (3) which are specially configured to cooperate with each other.

The body of the nut (2), in the illustrated embodiment, is six-sided, mimicking a conventional nut which is commonly used in the engineering and construction industries. A threaded central passage (4) for a fastener (not shown) runs between the top (2a) and the base (2b) of the nut.

Extending laterally outwards from its lower edge, the nut (2) includes a first flange (5), which acts as a shield for the washer. The flange helps to protect the washer from the fastening tool (not shown) used to manipulate the nut.

Depending from the interior edge (5a) of the first flange, is a neck (6), the lower edge (6a) of which is provided with a second flange (7) extending laterally outwards in more or less the same plane as the first flange (5).

It will be noted that the nut (2) is provided with a gap (8) through the neck (6) and second flange (7).

This gap (8) cooperates with two projections in the form of pegs (9, only one visible in each of FIGS. 1 and 2) arising from the inner perimeter (3a) of the washer (3). The washer also includes a pair of retaining claws (10) which includes horizontal elements (10a) configured to be complementary to the channel (11) defined between the first (5) and second flanges (7) of the nut (2).

To mate the washer (3) with the nut (2), prior to offering the nut assembly (1) to the fastener (not shown here but illustrated in FIG. 4) with which it is to be used, the pegs (9) are aligned with the gap (8) of the neck (6) and second flange (7) while the retaining claws (10) are aligned with the channel (11). The washer is slid or pressed laterally onto the nut and once in place, can be freely rotated while the retaining claws, now positioned in the channel, keeps the washer attached to the nut. It will be appreciated that the two pegs (9, not visible in FIG. 1) partially occlude the central passage (4) of the nut. This is deliberate and requires a specifically configured fastener (depicted in FIG. 4) to be used with the nut and washer assembly (1).

The outer perimeter (3b) of the washer (3) is specially profiled (12) to indicate the relative position of the pegs (9); this is to help with alignment of the nut and washer assembly (1) with the fastener.

Figure 3:
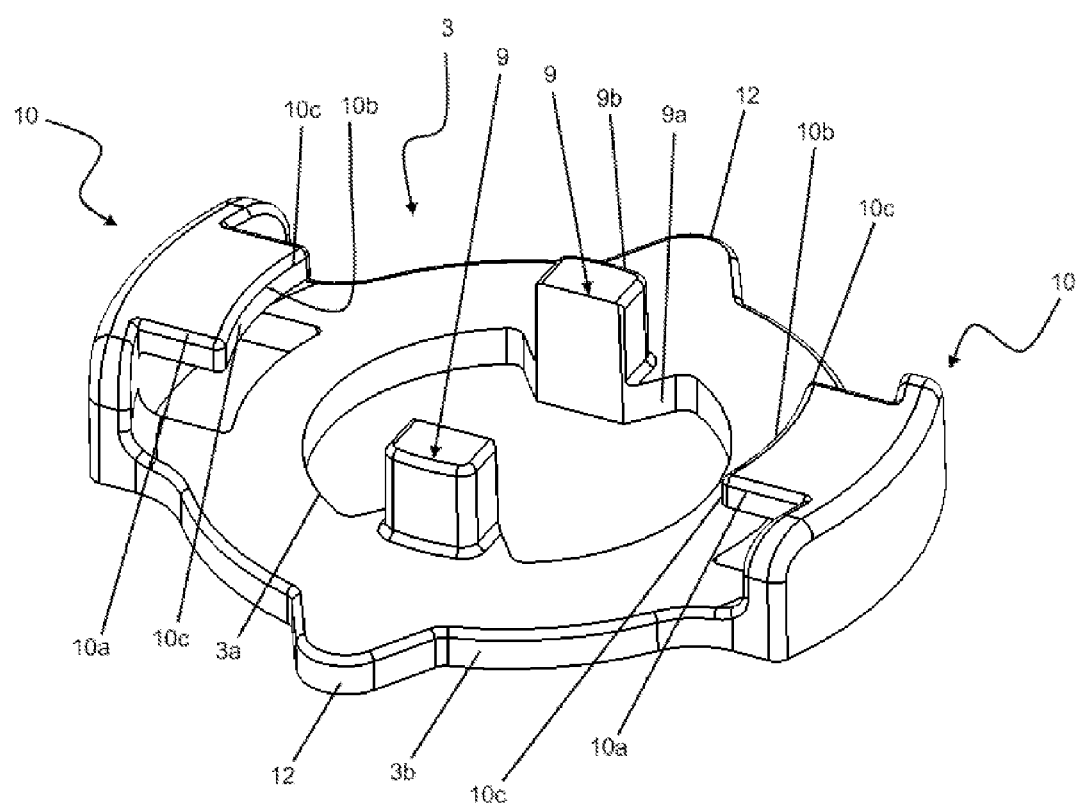
FIG. 3 is a top perspective view of the washer of the embodiments of FIGS. 1 and 2.

Referring now to FIG. 3, the washer (3) is more clearly seen in this view. The retaining claws (10) and their horizontal elements (10a) have previously been described. The horizontal surfaces also include an arc-shaped surface (10b) which is almost substantially complementary in configuration to the channel defined between the first and second flanges of the nut (not shown) with which the washer is to be used.

However, the distance between the opposing outer edges (10c) of the surface (10b) is less than the diameter of the neck (not shown); this means the outer edges of the two arcs come into contact with the bottom of the channel of the nut (not shown) before the washer is fully engaged. The user has to apply a little force in order to press or otherwise fully engage the washer (3) into the channel; once fully engaged, the washer is able to freely rotate relative to the nut, with the retaining claws (10) positioned within the channel and preventing the washer from readily separating from the nut.

The configuration of the pegs (9) is also more easily seen in this view. These include horizontal elements (9a) extending inwards from the inner perimeter (3a) of the washer (3). The corresponding protrusions (12) from the outer diameter (3b) mark the position of the pegs. The horizontal elements of the pegs mate with corresponding grooves in the fastener illustrated in FIG. 4. The pegs also include vertical elements (9b) extending upwards in the same orientation as the retaining claws (10). In use, these help to prevent the washer from being inadvertently threaded onto the fastener by extending upwards along the groove provided on its shaft.

Figure 4:
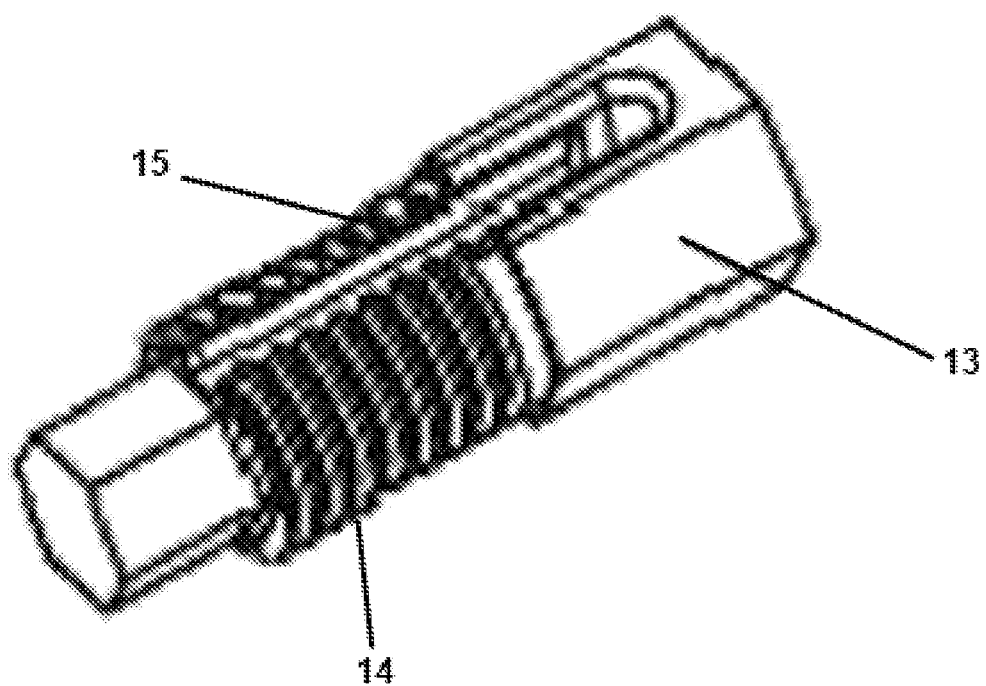
FIG. 4 is a side perspective of one embodiment of a fastener that may be used with the invention.

One embodiment of the fastener with which the nut and washer assembly of FIGS. 1 and 2 may be used is illustrated in FIG. 4. The fastener is a bolt with a head (13) and a threaded shaft (14) that has a pair of opposed grooves (15, only one visible in this view) running its length.

When the grooves are placed in alignment with the pegs (9 in FIGS. 1, 2 and 3) of the washer, this locks it relative to the bolt. As the nut is rotated in order to fasten (or loosen) it, the washer remains locked relative to the bolt.

Aspects of the present invention have been described by way of example only and it should be appreciated that modifications and additions may be made thereto without departing from the scope thereof as defined in the appended claims.

I claim:

1. A nut and washer assembly, wherein the assembly includes:
    a nut having a body configured with a pair of flanges defining a channel there between, wherein the first flange includes a gap there through, and
    a washer having an outer perimeter and an inner perimeter, wherein the washer also includes a plurality of projections, wherein a first projection arises proximate the inner perimeter and is complementary to the gap in the first flange of the nut and a second projection arises proximate the outer perimeter and is complementary to the channel of the nut,
    wherein the second projection includes a vertical element and a lateral projection from the vertical element extends towards the inner perimeter.

2. The nut and washer assembly as claimed in claim 1, wherein the washer includes a third projection, wherein the third projection opposes the first projection and arises proximate the inner perimeter.

3. The nut and washer assembly as claimed in claim 1, wherein the lateral projection is configured with an arcuate profile.

4. The nut and washer assembly as claimed in claim 1, wherein the washer includes a fourth projection, wherein the fourth projection opposes the second projection and includes a vertical element and a lateral projection from the vertical element extending towards the inner perimeter.

5. The nut and washer assembly as claimed in claim 1, wherein the first flange of the nut includes a second gap there through, the second gap opposing the first gap.

6. The nut and washer assembly as claimed in claim 1, wherein the outer perimeter of the washer corresponding with the position of the first projection is configured as a lateral projection extending away from the inner perimeter.

7. A method comprising:
assembling a nut and washer assembly according to claim 1 by executing at least the actions of:
a) aligning one of the projections of the washer with the nut; and
b) threading a fastener through the washer and nut assembly.

* * * * *